US011892014B2

(12) United States Patent
Jung et al.

(10) Patent No.: US 11,892,014 B2
(45) Date of Patent: Feb. 6, 2024

(54) HYDRAULIC MACHINE

(71) Applicant: Volvo Construction Equipment AB, Eskilstuna (SE)

(72) Inventors: Taerang Jung, Gyeongsangnam-do (KR); Sangmin Gwon, Gyeongsangnam-do (KR); Sangki Bae, Gyeongsangnam-do (KR)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 162 days.

(21) Appl. No.: 17/601,334

(22) PCT Filed: Apr. 5, 2019

(86) PCT No.: PCT/KR2019/004084

§ 371 (c)(1),
(2) Date: Oct. 4, 2021

(87) PCT Pub. No.: WO2020/204235

PCT Pub. Date: Oct. 8, 2020

(65) Prior Publication Data

US 2022/0186751 A1 Jun. 16, 2022

(51) Int. Cl.

*F15B 1/04* (2006.01)
*F15B 21/14* (2006.01)
*E02F 9/22* (2006.01)

(52) U.S. Cl.

CPC .............. *F15B 1/04* (2013.01); *E02F 9/2217* (2013.01); *F15B 21/14* (2013.01)

(58) Field of Classification Search

CPC ............................... E02F 9/2217; F15B 21/14
See application file for complete search history.

(56) References Cited

U.S. PATENT DOCUMENTS 9,091,041 B2 7/2015 Yoshida et al.
9,593,467 B2 3/2017 Kajita et al.
(Continued)

FOREIGN PATENT DOCUMENTS

CN 103890412 A 6/2014
EP 2770219 A1 8/2014
(Continued)

OTHER PUBLICATIONS

Supplementary European Search Report, EP Application No. 19922961.8, dated Oct. 31, 2022, 9 pages.
(Continued)

*Primary Examiner* — Kenneth Bomberg
*Assistant Examiner* — Matthew Wiblin
(74) *Attorney, Agent, or Firm* — Sage Patent Group

(57) ABSTRACT

A hydraulic machine includes: a power source; an assist motor including comprising an inlet port and an outlet port and assisting a torque of the power source; a tank; a collection line which is connected to the inlet port and allows a fluid to flow to the inlet port; a first return line which is connected to the tank and allows the fluid to flow to the tank; a self-priming line which connects the first return line to the inlet port and allows the fluid to flow from the first return line to the inlet port; and an anti-cavitation line which connects the outlet port to the self-priming line and allows the fluid to flow from the outlet port to the self-priming line.

8 Claims, 4 Drawing Sheets

(56) References Cited

U.S. PATENT DOCUMENTS

| | | | | |
|---|---|---|---|---|
| 2012/0151904 | A1 * | 6/2012 | Shang | E02F 9/123 60/416 |
| 2014/0245729 | A1 * | 9/2014 | Nanjo | E02F 9/2091 60/459 |
| 2018/0016770 | A1 * | 1/2018 | Honda | F15B 21/14 |
| 2021/0246633 | A1 * | 8/2021 | Ku | F15B 21/14 |

FOREIGN PATENT DOCUMENTS

| | | | |
|---|---|---|---|
| JP | 2011075082 | A | 4/2011 |
| JP | 2016205492 | A | 12/2016 |
| JP | 2019031989 | A | 2/2019 |
| KR | 1020150110597 | A | 10/2015 |
| KR | 101891376 | B1 | 9/2018 |
| WO | 2016169943 | A1 | 10/2016 |

OTHER PUBLICATIONS

Chinese Office Action, CN Application No. 201980094994.9, dated Oct. 18, 2022, 19 pages.

International Search Report and Written Opinion of the International Searching Authority, PCT/KR2019/004084, dated Jan. 3, 2020, 10 pages (including English International Search Report).

* cited by examiner

HYDRAULIC MACHINE

CROSS REFERENCE TO RELATED APPLICATIONS

This application is a 35 U.S.C. § 371 national stage application of PCT International Application No. PCT/KR2019/004084 filed on Apr. 5, 2019, the disclosure and content of which is incorporated by reference herein in its entirety.

TECHNICAL FIELD

The present disclosure relates, generally, to a hydraulic machine including an energy recovery circuit and, more particularly, to a hydraulic machine able to prevent cavitation from occurring in an energy recovery circuit.

BACKGROUND

A variety of hydraulic machines operating using hydraulic pressure are known in the art. Examples of such hydraulic machines include construction machinery, such as an excavator. Some hydraulic machines may recover hydraulic energy by directing high-pressure fluid discharged from a boom actuator toward an energy recovery hydraulic circuit, rather than to a tank, in order to increase energy efficiency. Such an energy recovery hydraulic circuit may include a hydraulic motor (i.e., an assist motor) connected to a power source, e.g., a drive shaft (i.e., a main shaft) of the engine and serving to recover energy contained in high-pressure fluid discharged from a boom actuator in order to provide torque-assistance for the power source.

However, in such a hydraulic machine, when a recovery function is turned off or when, even though the recovery function is turned on, a boom down operation has not been performed, there may be no energy to be recovered in some situations. In such situations, the assist motor connected to the drive shaft of the engine is driven by the rotation of the drive shaft, instead of providing torque-assistance for the power source. At this time, when the flow rate of fluid supplied to the assist motor is insufficient, cavitation may occur, thereby damaging not only the assist motor but also the entirety of the hydraulic machine.

SUMMARY

Accordingly, the present disclosure has been made in consideration of the above-described problems occurring in the related art, and the present disclosure is intended to prevent cavitation from occurring in an energy recovery circuit.

In addition, the present disclosure is intended to obtain high energy recovery efficiency.

In order to achieve the above objectives, according to one aspect of the present disclosure, a hydraulic machine may include: a power source; an assist motor including an inlet port and an outlet port and configured to provide torque-assistance for the power source; a tank; a recovery line connected to the inlet port to allow fluid to flow to the inlet port; a first return line connected to the tank to allow fluid to flow to the tank; a self-priming line connecting the first return line and the inlet port and configured to allow fluid to flow from the first return line to the inlet port; and an anti-cavitation line connecting the outlet port and the self-priming line and configured to allow fluid to flow from the outlet port to the self-priming line.

In some embodiments, the hydraulic machine may further include a second return line connecting the outlet port and the tank to allow fluid to flow from the outlet port to the tank.

In some embodiments, the hydraulic machine may further include a drain valve provided on the second return line to allow fluid to flow from the outlet port to the tank via the second return line or prevent fluid from flowing from the outlet port to the tank via the second return line.

According to embodiments, the present disclosure may obtain the above-described objectives.

Hereinafter, embodiments of the present disclosure will be described in detail with reference to the accompanying drawings.

Figure 1:
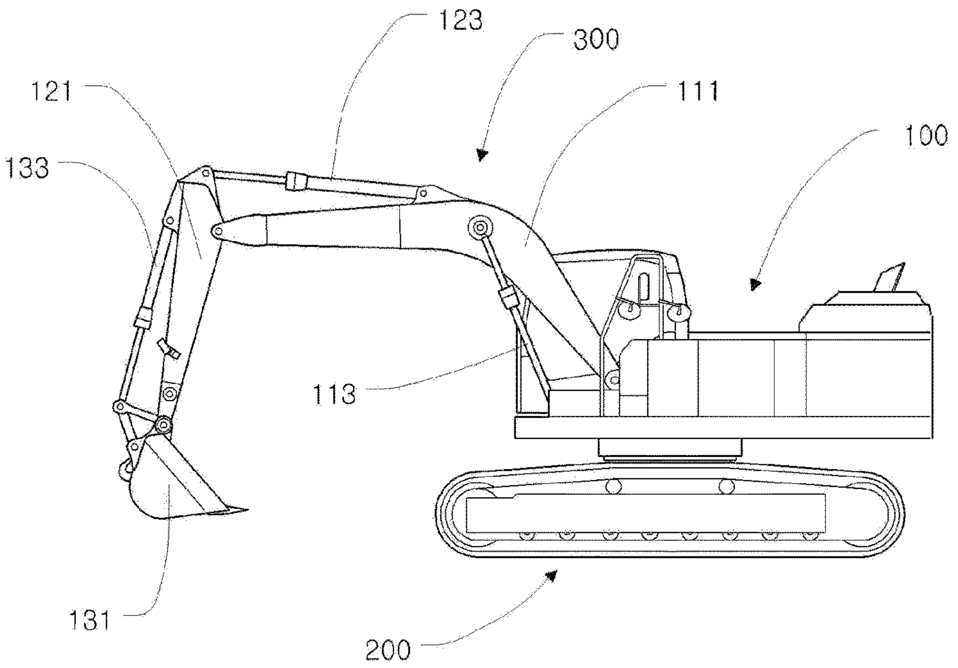
FIG. 1 is a schematic diagram illustrating an external appearance of a hydraulic machine according to some embodiments.

FIG. 1 is a schematic diagram illustrating an external appearance of a hydraulic machine according to some embodiments.

A hydraulic machine may perform work by actuating a working device 300 using hydraulic pressure. In some embodiments, the hydraulic machine may be a construction machine.

In some embodiments, the hydraulic machine may be an excavator as illustrated in FIG. 1. The hydraulic machine may include an upper structure 100, an under structure 200, and the working device 300.

The under structure 200 includes a travel actuator allowing the hydraulic machine to travel. The travel actuator may be a hydraulic motor.

The upper structure 100 may include a pump, a working fluid tank, a power source, a control valve, and the like. In addition, the upper structure 100 may include a swing actuator allowing the upper structure 100 to rotate with respect to the under structure 200. The swing actuator may be a hydraulic motor.

The working device 300 allows the excavator to work. The working device 300 may include a boom 111, an arm 121, and a bucket 131, as well as a boom actuator 113, an arm actuator 123, and a bucket actuator 133 actuating the boom 111, the arm 121, and the bucket 131, respectively. The boom actuator 113, the arm actuator 123, and the bucket actuator 133 may be hydraulic cylinders, respectively.

Figure 2:
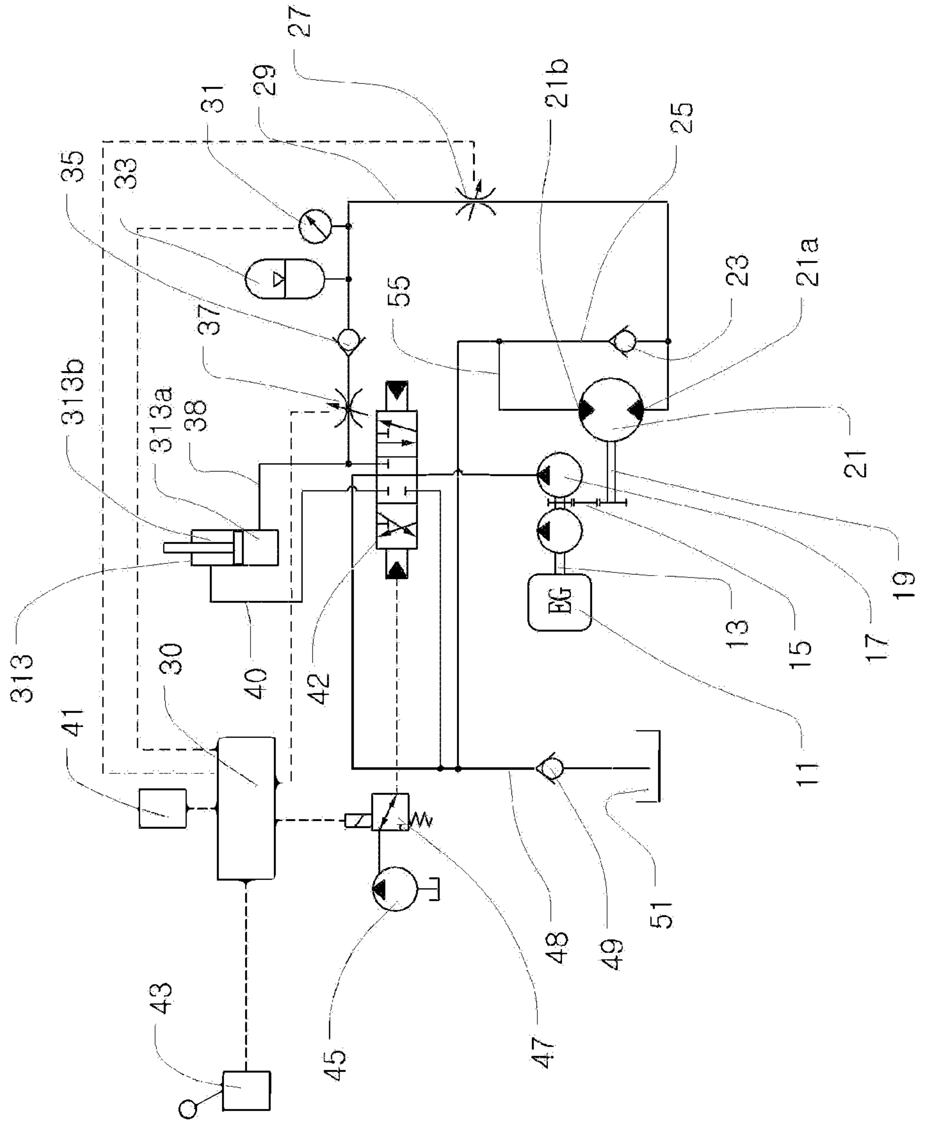
FIG. 2 is a circuit diagram illustrating a hydraulic machine according to some embodiments.

J FIG. 2 is a circuit diagram illustrating a hydraulic machine according to some embodiments.

In some embodiments, the hydraulic machine may include a power source 11, a main pump 17, a tank 51, the boom actuator 313, an energy recovery circuit, and a controller 30.

In some embodiments, the power source 11 may be an engine. The power source 11 may drive the main pump 17 by delivering power to the main pump 17 through a main shaft 13. The main pump 17 may pressurize fluid and direct the pressurized fluid toward the boom actuator 313. The boom actuator 313 may receive the pressurized fluid from the main pump 17 and return fluid to the tank 51. The boom actuator 313 may operate the boom by providing the force of the pressurized fluid received from the main pump 17 to the boom.

In some embodiments, the boom actuator 313 may be a hydraulic cylinder, and may include a large chamber 313*a* and a small chamber 313*b*. Since a piston rod connected to the boom extends through the small chamber 313*b*, an effective area on which the pressure inside the small chamber 313*b* acts on the piston is smaller than an effective area on which the pressure inside the large chamber 313*a* acts on the piston, due to the area occupied by the piston rod. Also referring to FIG. 1, in a boom down operation in which the boom is moved downwardly, the piston rod is also moved downwardly. Consequently, fluid enters the small chamber 313*b*, whereas fluid is discharged from the large chamber 313*a*.

In some embodiments, the hydraulic machine may include a control valve 42 connecting the main pump 17, the tank 51, and the boom actuator 313 to control directions of fluid flowing therebetween. In some embodiments, the control valve 42 may be located in a neutral position, a first non-neutral position, or a second non-neutral position. When in the neutral position, the control valve 42 may prevent fluid from communicating with the boom actuator 313 and return fluid that has flowed from the main pump 17 to the tank 51 via a central bypass path. When the control valve 42 is in the first non-neutral position (after having moved to the right in FIG. 2), the control valve 42 may prevent fluid that has flowed from the main pump 17 from returning via the central bypass path, direct the fluid that has flowed from the main pump 17 to the small chamber 313*b*, and direct fluid that has flowed from the large chamber 313*a* to the tank 51, thereby lowering the boom. When the control valve 42 is in the second non-neutral position (after having moved to the left in FIG. 2), the control valve 42 may prevent fluid that has flowed from the main pump 17 from returning to the tank 51 via the central bypass path, direct the fluid that has flowed from the main pump 17 to the large chamber 313*a*, and direct fluid that has flowed from the small chamber 313*b* @to the tank 51, thereby raising the boom. In some embodiments, the hydraulic machine may include a first line 38 connecting the large chamber 313*a* and the control valve 42 and a second line 40 connecting the small chamber 313*b* and the control valve 42.

In some embodiments, the hydraulic machine may include a first operator input device 43 to move the control valve 42. An operator may input his/her desire to raise or lower the boom by moving the first operator input device 43.

In some embodiments, the first operator input device 43 may generate an electrical signal indicating the operator's desire and transmit the electrical signal to the controller 30. In some embodiments, the hydraulic machine may include a pilot pump 45 and an electronic proportional pressure reducing valve 47. After receiving an electrical signal from the first operator input device 43, the controller 30 may responsively operate the electronic proportional pressure reducing valve 47. The electronic proportional pressure reducing valve 47 may operate the control valve 42 by directing pilot fluid that has flowed from the pilot pump 45 to the control valve 42.

In some alternative embodiments, the hydraulic machine may include a common pressure reducing valve (not shown) in place of the electronic proportional pressure reducing valve 47 mentioned above. In these embodiments, the first operator input device 43 may be connected to the pressure reducing valve, such that the operator may directly manipulate the pressure reducing valve by means of the first operator input device 43. In addition, the pilot pump 45 may be connected to the pressure reducing valve, and the pressure reducing valve may transmit a hydraulic signal indicating the operator's desire, input by the operator by means of the first operator input device 43, to the control valve 42. In some embodiments, the hydraulic machine may include a sensor configured to measure the pressure of the hydraulic signal transmitted to the control valve 42, and provide an electrical signal corresponding to the hydraulic signal to the controller 30. Thus, although the controller 30 is not directly connected to the first operator input device 43, the controller 30 may determine the operator's desire input by the operator, i.e., whether a desire to lower the boom is input or a desire to raise the boom is input.

In some embodiments, the hydraulic machine may include a first return line 48 connected to the tank 51 and allowing fluid to flow to the tank 51. Fluid returning from the main pump 17 to the tank 51 via the central bypass path and fluid returning from the boom actuator 313 to the tank 51 may join in the first return line 48. In some embodiments, the hydraulic machine may include a check valve 49 provided on the first return line 48 between a joint to which a self-priming line 25 is connected and the tank 51. The check valve 49 prevents fluid from flowing back from the tank 51 to the joint via the first return line 48.@

The energy recovery circuit may recover energy contained in the high pressure fluid discharged from the large chamber during the boom down operation.

In some embodiments, the hydraulic machine may include a second operator input device 41. The second operator input device 41 may receive a request input by the operator for an energy recovery function to be turned on or off, and transmit corresponding information to the controller 30 as an electrical signal.

In some embodiments, the energy recovery circuit may include a recovery line 29, an assist motor 21, the self-priming line 25, and an anti-cavitation line 55.

In some embodiments, the assist motor 21 may be a hydraulic motor. The assist motor may include an inlet port 21*a* through which fluid enters and an outlet port 21*b* through which fluid exits. The assist motor may serve as an auxiliary power source assisting the power source 11.

The recovery line 29 may be connected to the large chamber 313*a* of the boom actuator 313 and to the inlet port 21*a* of the assist motor to allow fluid to flow from the large chamber 313*a* to the inlet port. In some embodiments, the recovery line 29 may be connected to the first line 38 connecting the large chamber 313*a* and the control valve 42.

In some embodiments, as mentioned above, the hydraulic machine may include the second operator input device 41. The operator may input a request for the recovery function to be turned on or off to the second operator input device 41. The second operator input device 41 is connected to the controller 30 to transmit the operator's request to the controller 30 as an electrical signal. When the request for the recovery function to be turned on is input, the controller 30 turns the energy recovery circuit on. When the request for the recovery function to be turned off is input, the controller 30 turns the energy recovery circuit off. Turning the energy recovery circuit on or off may be performed by the controller 30 operating a first valve 37 and a second valve 27 to be described later.

In some embodiments, the hydraulic machine may include a power transmission connecting the power source 11, the assist motor, and the main pump 17 to transmit power therebetween. In some embodiments, the power transmission may include the main shaft 13, an assist shaft 19, and a power transmission part 15. The main shaft 13 may connect the power source 11 and the main pump 17 to transmit power from the power source 11 to the main pump 17. The assist shaft 19 may be connected to the assist motor. The power transmission part 15 may connect the main shaft 13 and the assist shaft 19 to transmit power from the assist shaft 19 to the main shaft 13 or from the main shaft 13 to the assist shaft 19. In some embodiments, the power transmission part 15 may include a gear train as illustrated in FIG. 2. However, the present disclosure is not limited thereto and may include a variety of other embodiments.

When the flow rate of the high pressure fluid entering the recovery line 29 is sufficient, energy is recovered by the assist motor. The recovered energy for the power source 11 is provided sequentially through the assist shaft 19, the power transmission part 15, and the main shaft 13.@

However, when the recovery function is turned off by the second operator input device 41, or when the boom has not been lowered since no boom down operation request was input through the first operator input device 43, even though the recovery function is turned on by the second operator input device 41, the flow rate of the high pressure fluid entering the recovery line 29 may be insufficient. Thus, the assist motor may not be able to recover energy. At this time, the assist motor does not provide power for the power source 11 to assist the power source 11 but may be driven along with the rotation of the main shaft 13, since the assist motor is connected to the main shaft 13 through the assist shaft 19 and the power transmission part 15.

In some embodiments, the self-priming line 25 may connect the first return line 48 and the inlet port 21*a* to allow fluid to flow from the first return line 48 to the inlet port 21*a*. In some of such embodiments, the self-priming line 25 may connect the first return line 48 and the recovery line 29. A check valve 23 may be provided on the self-priming line 25 between a joint to which the anti-cavitation line 55 is connected and the inlet port 21*a* to prevent fluid from flowing back to the joint from the inlet port 21*a* via the self-priming line 25.

When the assist motor is driven along with the rotation of the main shaft 13, when the flow rate of the flow in the self-priming line 25 is insufficient, cavitation may occur. Thus, in order to prevent such cavitation, the hydraulic machine may include an anti-cavitation line connecting the outlet port 21*b* and the self-priming line 25. The anti-cavitation line may allow fluid to flow from the outlet port 21*b* to the self-priming line 25, thereby preventing cavitation.

In some embodiments, the first valve 37 is provided on the recovery line 29. In some embodiments, the hydraulic machine may include an accumulator 33 connected to the recovery line 29 between the first valve 37 and the inlet port 21*a*. In some embodiments, the hydraulic machine may include the second valve 27 provided on the recovery line 29 between a portion to which the accumulator 33 is connected and the inlet port 21*a*. In some embodiments, when a request for the recovery function to be turned on is input to the second operator input device 41 and a boom down operation request is input to the first operator input device 43, the controller 30 may operate the first valve 37 and the second valve 27 to allow fluid to flow via the recovery line 29.

Reference numeral 35 that has not been described above denotes a check valve.

Figure 3:
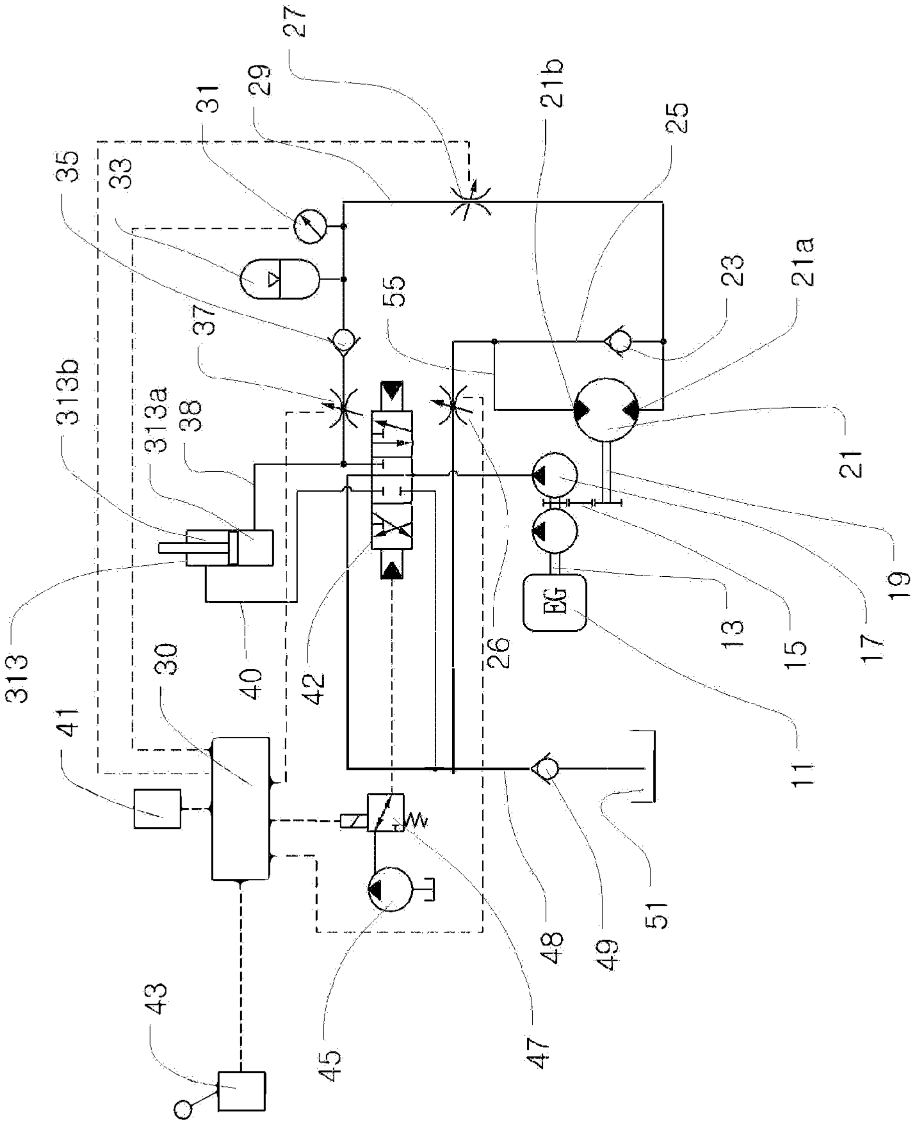
FIG. 3 is a circuit diagram illustrating a hydraulic machine according to some embodiments.

FIG. 3 is a circuit diagram illustrating a hydraulic machine according to some embodiments.

In some embodiments, the hydraulic machine may include a drain valve 26 provided on the self-priming line 25 between a joint to which the anti-cavitation line 55 is connected and the first return line 48. The drain valve 26 may allow fluid to flow from the joint to the first return line 48 or prevent fluid from flowing from the joint to the first return line 48.

In some embodiments, when the pressure of fluid in the recovery line 29 is lower than a predetermined value, the fluid may be prevented from flowing from the joint to the first return line 48 via the self-priming line 25. When the pressure of the fluid in the recovery line 29 is lower than the predetermined value, cavitation may occur due to the insufficient flow rate of fluid entering the assist motor 21 via the recovery line 29. Thus, the controller 30 prevents fluid in the anti-cavitation line 55 from being discharged to the tank 51 via the self-priming line 25 and the first return line 48.

In some embodiments, when the pressure of fluid in the recovery line 29 is equal to or higher than the predetermined value, the drain valve 26 may allow fluid to flow from the joint to the first return line 48 via the self-priming line 25. When the pressure of the fluid in the recovery line 29 is equal to or higher than the predetermined value, there may be no risk of cavitation, due to the sufficient flow rate of fluid entering the assist motor 21 via the recovery line 29. Thus, in order to obtain high recovery efficiency, the drain valve 26 allows fluid in the anti-cavitation line 55 to be discharged to the tank 51 via the self-priming line 25 and the first return line 48, thereby reducing the pressure of fluid exiting through the outlet port 21*b*.

In some embodiments, the energy recovery circuit may include a sensor 31 measuring the pressure inside the recovery line 29. In some embodiments, the sensor 31 may be connected to the recovery line 29 between the first valve 37 and the second valve 27. The sensor 31 may transmit an electrical signal corresponding to the magnitude of the pressure to the controller 30.

Figure 4:
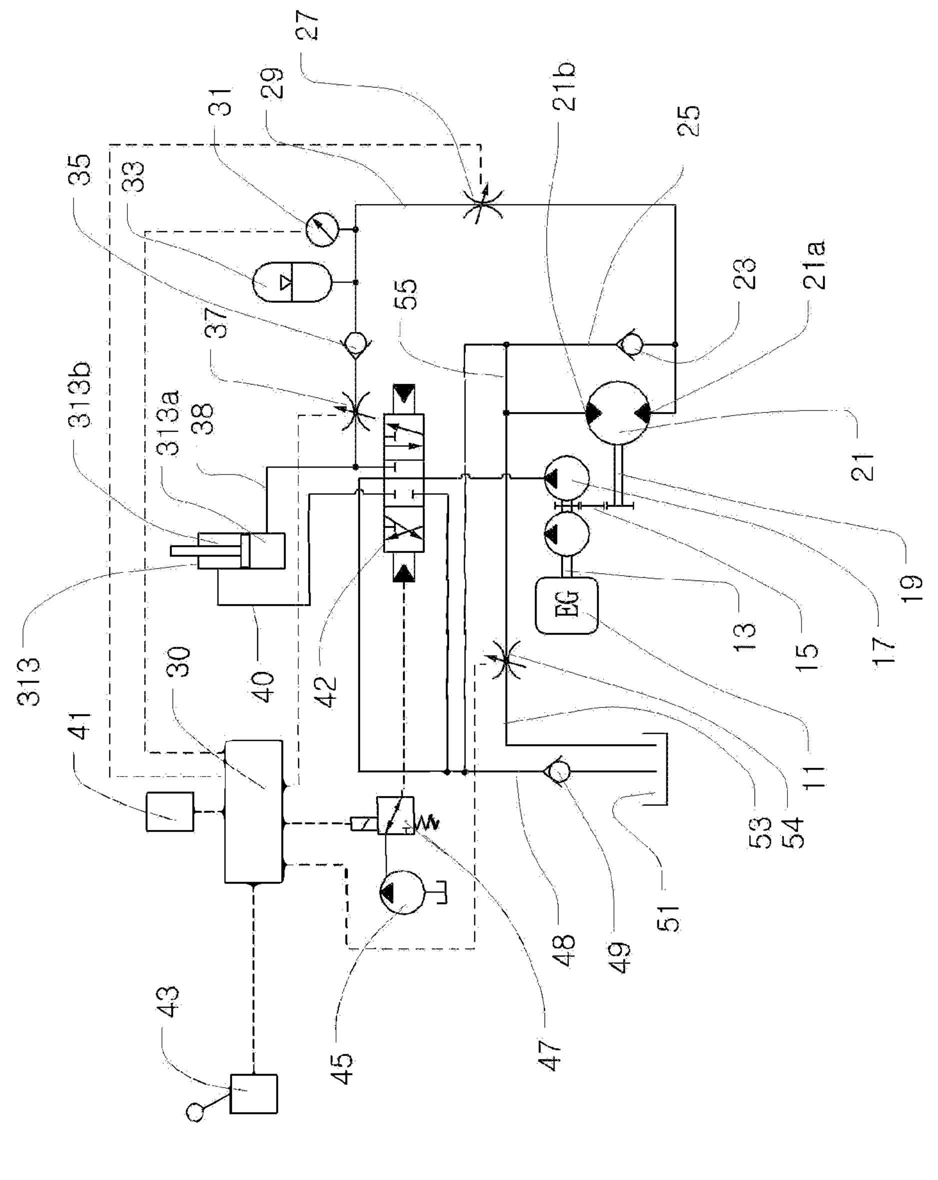
FIG. 4 is a circuit diagram illustrating a hydraulic machine according to some embodiments.

FIG. 4 is a circuit diagram illustrating a hydraulic machine according to some embodiments.

In some embodiments, the hydraulic machine may include a second return line 53 connecting the outlet port 21*b* and the tank 51. The second return line 53 may allow fluid to flow from the outlet port 21*b* to the tank 51.

In some embodiments, the hydraulic machine may include a drain valve 54 provided on the second return line 53. The drain valve 54 may allow fluid to flow from the outlet port 21*b* to the tank 51 via the second return line 53 or prevent fluid from flowing from the outlet port 21*b* to the tank 51 via the second return line 53.

A back pressure of about 5 bars is typically applied in the first return line 48, thereby reducing recovery efficiency. Thus, when the pressure of fluid in the recovery line 29 is equal to or higher than a predetermined value, there may be no risk of cavitation, due to the sufficient flow rate of fluid entering the assist motor via the recovery line 29. Thus, in order to obtain high recovery efficiency, the drain valve 54 may allow fluid to flow from the outlet port 21*b* to the tank 51 via the second return line 53.

In contrast, when the pressure of fluid in the recovery line 29 is lower than the predetermined value, cavitation may occur, due to the insufficient flow rate of fluid entering the assist motor via the recovery line 29. Thus, the controller 30 may control the drain valve 54 to prevent fluid from flowing from the outlet port 21*b* to the tank 51 via the second return line 53.

The invention claimed is:

1. A hydraulic machine comprising:

a power source;

an assist motor comprising an inlet port and an outlet port and configured to provide torque-assistance for the power source;

a tank;

a recovery line connected to the inlet port to allow fluid to flow to the inlet port;

a first return line connected to the tank to allow fluid to flow to the tank;

a self-priming line connecting the first return line and the inlet an anti-cavitation line connecting the outlet port and the self-priming line and configured to allow fluid to flow from the outlet port to the self-priming line; and a drain valve provided on the self-priming line between a joint to which the anti-cavitation line is connected and the first return line to allow fluid to flow from the joint to the first return line or prevent fluid from flowing from the joint to the first return line.

2. The hydraulic machine of claim 1, further comprising a check valve provided on the self-priming line between a joint to which the anti-cavitation line is connected and the inlet port, wherein the check valve prevents fluid from flowing from the inlet port to the joint via the self-priming line.

3. The hydraulic machine of claim 1, wherein, when a pressure of fluid in the recovery line is equal to or higher than a predetermined value, the drain valve allows fluid to flow from the joint to the first return line via the self-priming line, and when the pressure of the fluid in the recovery line is lower than the predetermined value, the drain valve prevents fluid from flowing from the joint to the first return line via the self-priming line.

4. The hydraulic machine of claim 1, further comprising an actuator comprising a large chamber and a small chamber, wherein the recovery line is connected to the large chamber.

5. The hydraulic machine of claim 4, further comprising:

a first valve provided on the recovery line;

an accumulator connected to the recovery line between the first valve and the inlet port; and a second valve provided on the recovery line between the accumulator and the inlet port.

6. The hydraulic machine of claim 1, further comprising a check valve provided on the first return line between a joint to which the self-priming line is connected and the tank, wherein the check valve prevents fluid from flowing from the tank to the joint via the first return line.

7. The hydraulic machine of claim 1, further comprising:

a pump driven by the power source; and a power transmission connecting the power source, the assist motor, and the pump to transmit power therebetween.

8. The hydraulic machine of claim 7, wherein the power transmission comprises:

a main shaft connecting the power source and the pump to deliver power from the power source to the pump;

an assist shaft connected to the assist motor; and a power transmission part connecting the main shaft and the assist shaft to deliver power from the main shaft to the assist shaft or from the assist shaft to the main shaft.

* * * * *